ROBERT C. READ
ERNEST W. SCHLIEBEN
INVENTORS

Oct. 29, 1946.  R. C. READ ET AL  2,410,234
COMBINATION AERIAL AND LAND VEHICLE
Filed Nov. 9, 1943  4 Sheets-Sheet 2

ROBERT C. READ
ERNEST W. SCHLIEBEN
INVENTOR.

BY

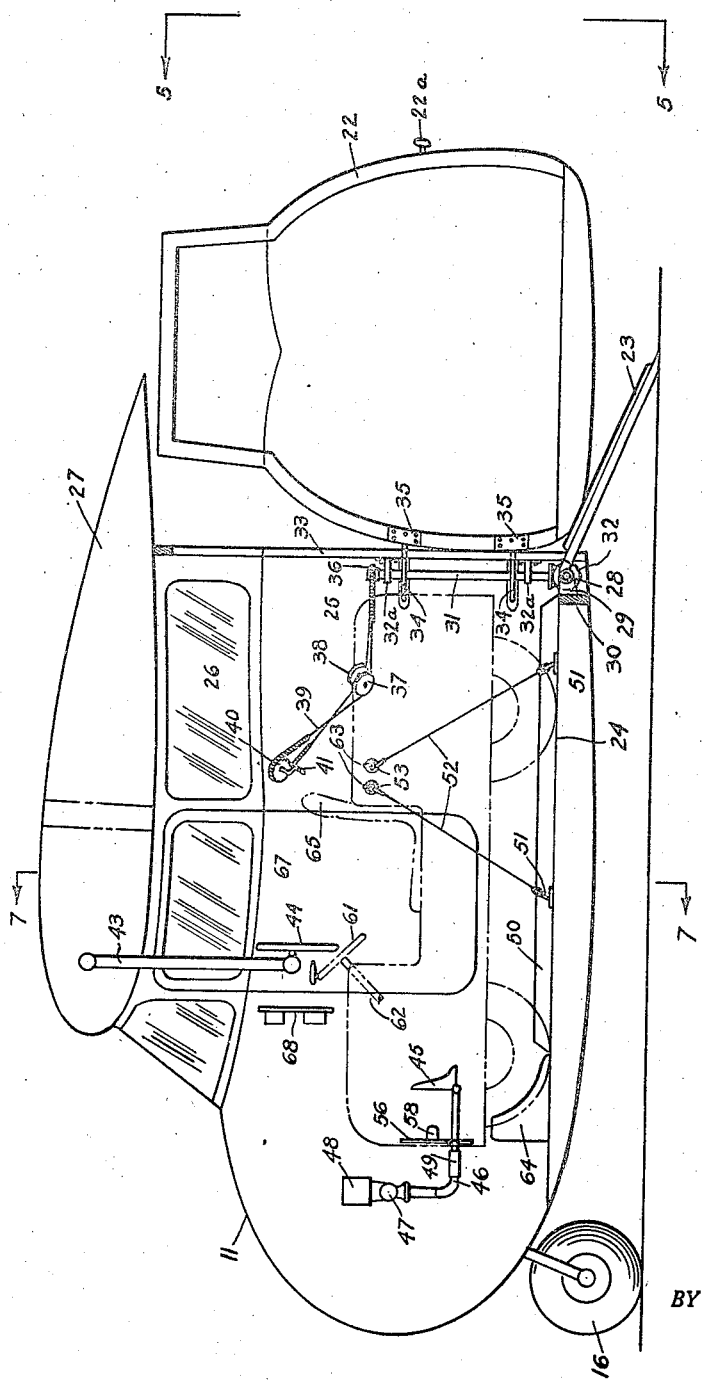

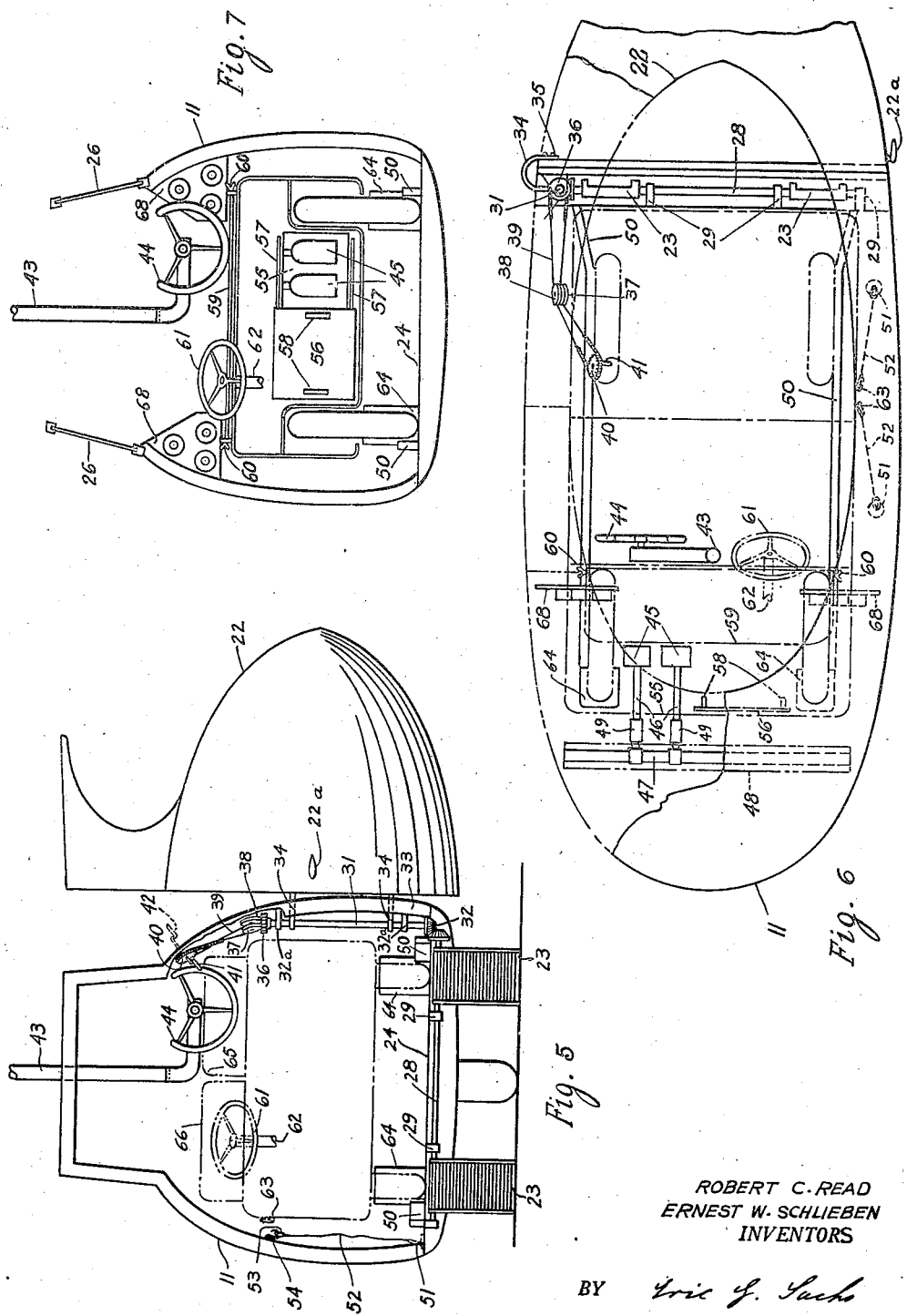

Patented Oct. 29, 1946

2,410,234

UNITED STATES PATENT OFFICE 2,410,234

COMBINATION AERIAL AND LAND VEHICLE

Robert C. Read, Wilton, Conn., and Ernest W. Schlieben, Scarsdale, N. Y., assignors to York Research Corporation, New York, N. Y.

Application November 9, 1943, Serial No. 509,570

6 Claims. (Cl. 244—2)

This invention relates to means of transportation. More particularly this invention relates to a certain combination between two vehicles, one of which is adapted for travel on land, the other one being adapted for flight, each of the vehicles having the specific characteristics of vehicles for land travel and air travel respectively.

With the growing popularity of the airplane and the desire for more and more speed in long distance travel, the trend of travelling at present is definitely directed towards the use of airplanes for single persons as well as small groups of persons travelling for instance from one city to another. For land travel inside the cities, however, the automobile or an equivalent will always be needed. For instance for salesmen who have to visit many cities or towns and have to call on many different places within a city or town, it is most desirable to travel by air from town to town and to use a motor car within the town. Furthermore, each individual person who wants to travel by air needs means of transportation by which to get to the place where the airplane is parked.

The trend therefore is more and more towards a means of transportation which combines both the advantages of an airplane as well as of a motor car. Many proposals have been made for such a combination. Some of the designs provide for automobiles which have provisions for the attachment of "flying units." Some designs provide for airplanes, the wings of which are foldable backwards or upwards so that the plane may find enough room on a road and may be used as a land vehicle.

All proposals made up to now provide either for vehicles which are very unusual in shape for the intended purpose or they provide for the attachment and detachment of bulky parts in order to make the vehicle adapted for one of the two kinds of travel. Also the rotative wing airplane which needs relatively small room on the ground is no vehicle which could be attractive and suitable for travel through city streets.

The primary object of the invention is to create a means of transportation which serves as well for land as for air travel and overcoming thereby the above mentioned disadvantages;

A further object of the invention is to give the vehicle for the land travel all the characteristics of a land vehicle, and to give the vehicle for air travel all the characteristics of an air vehicle regarding both the looks of the vehicle and its operation;

Another object of the invention is to make the operation of both vehicles a standard one in order to facilitate the handling of both vehicles;

A still further object of the invention is to render the change from air travel to land travel and vice versa as convenient, simple and quick as possible.

Other objects and a fuller understanding of the invention may be had by referring to the following description and claims, taken in conjunction with the accompanying drawings which shall, however, be in no way limitative but merely illustrative to explain the nature and operation of the invention.

The means for transportation according to the invention comprise in combination a regular motor car for land travel and a regular airplane for air travel. Both vehicles have all standard characteristics of an airplane and a motor car respectively and are both operated in the conventional way. The vehicles are however, so adapted to each other that the motor car can be driven inside the airplane compartment and the airplane can be operated by the pilot (or driver) from within the motor car without his leaving the car at all.

Fig. 4 is a longitudinal section in larger scale on line 4—4 of Fig. 2 with the door open, the motor car shown in phantom lines, and the engine and tail parts omitted;

Fig. 5 is a rear view of Fig. 4 as indicated by line 5—5 in Fig. 4 whereby the wings are omitted;

Fig. 6 is a horizontal section in larger scale on line 6—6 of Fig. 1 with parts of the hull broken away to show the inside of the compartment;

Fig. 7 is a section on line 7—7 of Fig. 4 looking forward towards the front end of the motor car.

Figure 1:
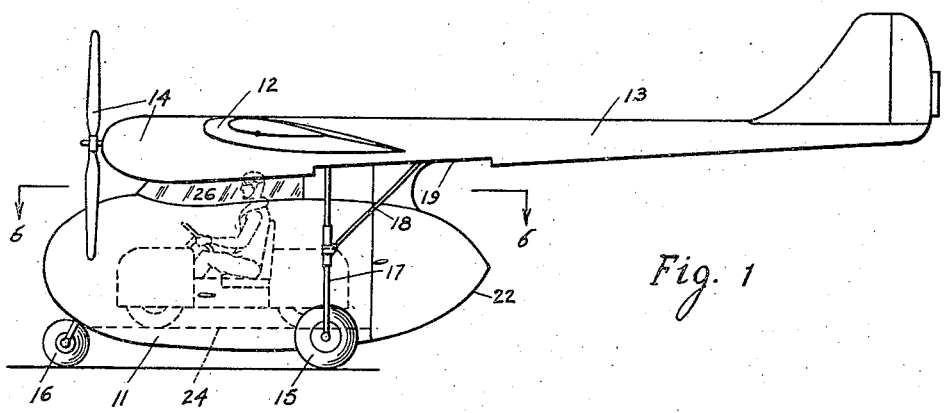
Fig. 1 is a side elevation of an airplane according to the invention showing the motor car inside the plane.
Figure 2:
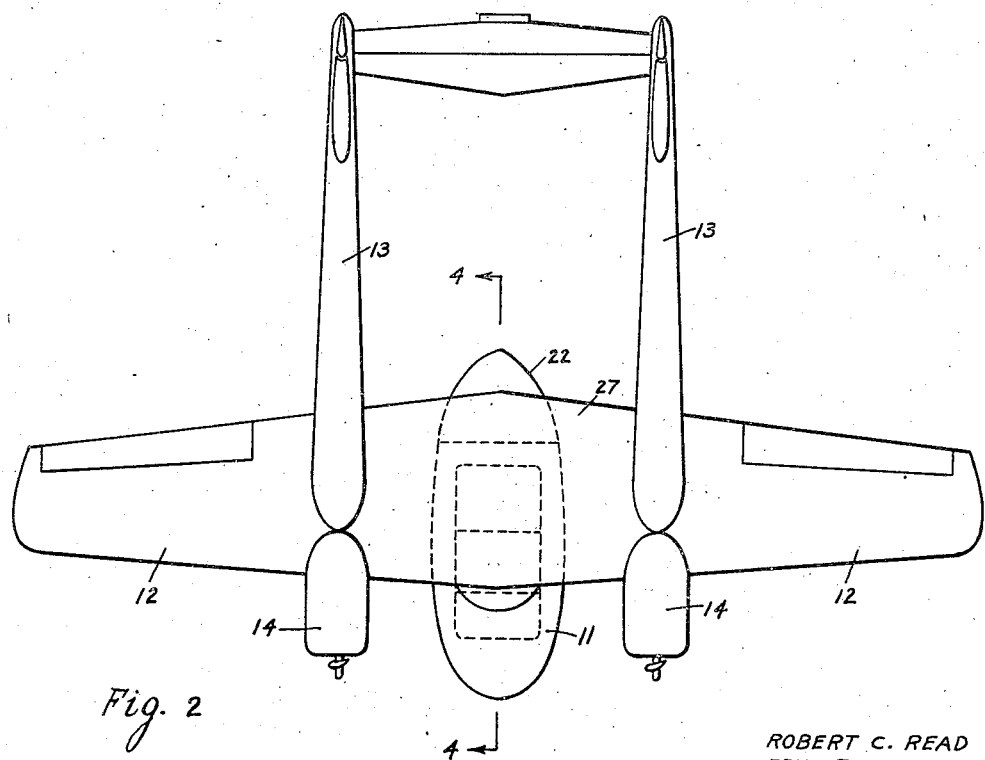
Fig. 2 is a plan view of Fig. 1.
Figure 3:
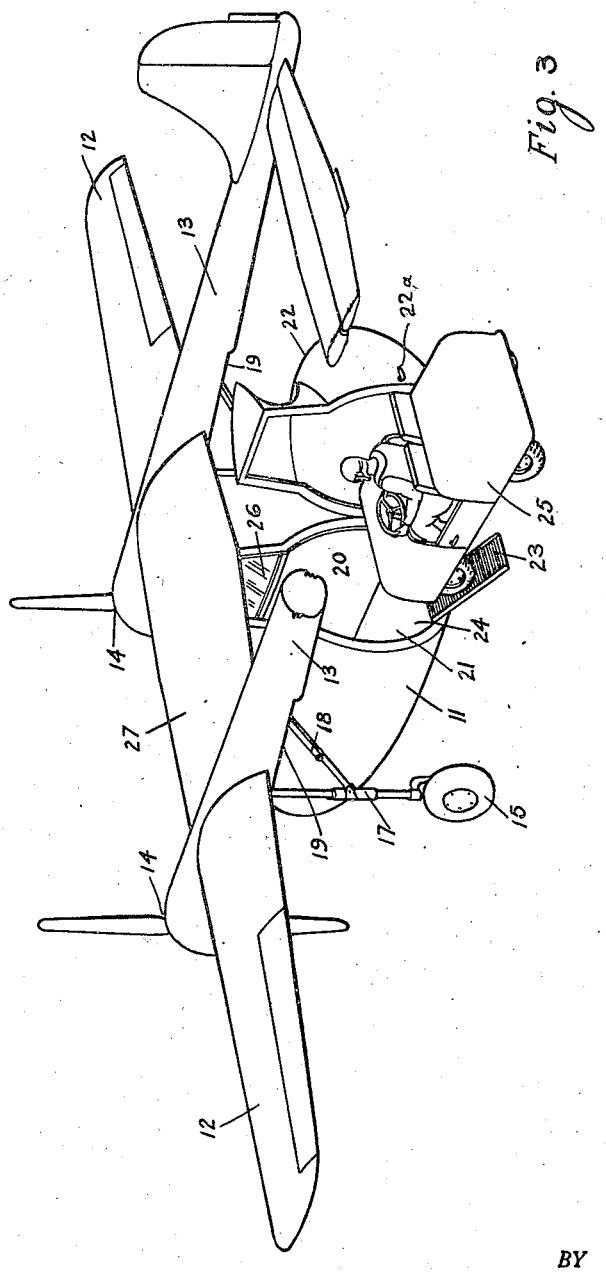
Fig. 3 is a perspective view of the airplane with its compartment open and the motor car just being driven over the access ramp. Some parts of the airplane have been broken away in this view and all details of the plane compartment have been omitted.

Referring now to Figs. 1, 2 and 3, the airplane in the embodiment shown has a fuselage 11 with two high wings 12, two tail booms 13, two engines and propellers 14, two main wheels 15, one nose wheel 16 and all the conventional control surfaces. The plane is supported on the ground by shock struts 17 which are linked to the tail booms by struts 18. The main wheels can be retracted into recesses 19 of the tail booms.

A compartment 20 is provided inside the fuselage which has a rear opening 21 which can be opened and closed by means of a closure 22 with a handle 22a. The closure is streamlined and forms when closed the rear part of the fuselage. A ramp 23 consisting of two narrow parts is linked to the aft end of the compartment floor 24 for the access of a motor car 25 as shown in Fig. 3. The upper part of the sidewalls of the compartment 20 is made of transparent windows 26 which offer the pilot full visibility on all sides. The top part of the compartment is formed by the center part 27 of the wings which center part may be partly transparent to give unobstructed upward view.

Referring now to Figs. 4, 5 and 6, the ramp parts 23 are fastened to a common horizontal shaft 28 which is supported by a number of brackets 29 fastened to a beam 30 under the compartment floor 24. The shaft 28 rotatably engages a second, vertical shaft 31 through bevel gearing 32. Shaft 31 is supported in brackets 32a which are secured to the frame 33 of the compartment opening. Hinges 34 are screwed at 35 to the door 22 and are rigidly connected with the rotatable vertical shaft 31. A sprocket wheel 36 is rigidly secured to the top end of shaft 31. Two pulleys 37 and 38 are rotatably mounted on the side wall of the compartment 20 and serve as guides for a continuous chain and cable member 39 which runs over the sprocket wheel 36 and is actuated by a sprocket wheel 40 with a crank 41. The sprocket wheel 40 is rotatably mounted at the side wall of the compartment at a place where it can easily be reached and operated by the pilot. This sprocket wheel is so arranged that a detachable crank 42 can be attached to it from the outside of the fuselage as indicated with broken lines in Fig. 5, so that the mechanism described can be operated from the inside of the compartment as well as from outside the plane.

As can readily be seen from Figs. 4 to 7 inclusive conventional control means, such as foot pedals and steering wheel are arranged in the front end of the airplane compartment. A tube 43 extends through the top center of the compartment and is then bent to the right side so that the steering wheel 44 is in easy reach of the pilot. Two foot pedals 45 are mounted on bent levers 46 rigidly connected with a tube 47 which is rotatably mounted in brackets secured to a cross beam 48. As will be described later on the horizontal arms of the bent levers 46 are made so long that, when the motor car is inside the compartment, the pedals are readily operable by the pilot seated in a front seat of the car. Adjusting means 49 may be provided to adjust the length of the horizontal arms to the convenience of the pilot. No special reference is made as to the parts of the airplane which are operated by the different control means as this does not form any part of the invention. The control means may operate the plane in a standard way, or they may as well be changed so that the operation of the airplane becomes very similar to the operation of a motor car. Such arrangement would greatly facilitate for the pilot or driver the change from the operation of one vehicle to the other.

To facilitate for the driver of the motor car the task of bringing the car into accurate position inside the compartment two guide rails 50 are arranged on the compartment floor 24 which may, as shown in Fig. 6, diverge towards the compartment opening. It is then easy for the driver to drive the car between these guide rails. Stop blocks 64 are provided at the ends of the guide rails which determine the end position of the motor car.

Fittings 51 are fastened to the compartment floor close to the side walls and cables or rods 52 are attached to these fittings which serve, as will be shown later on, to tie the motor car to the compartment in its predetermined position inside the plane. Rings 53 are attached to the free ends of the cables or rods 52 and hooks 54 at the side wall of the compartment serve to secure the rings when the tie means are not in use. The tie means are shown in the drawings only on one side of the compartment but it is obvious that they may, if necessary, as well be provided on two opposite sides of the compartment.

To complete the airplane, instrument boards 68 may be arranged at proper places and a door 67 may be provided in the compartment next to the pilot's seat in the motor car.

As to the motor car used for the transportation means according to the invention, those features of the car which deviate from standard cars are shown in the drawings. The car must of course be of a size which conforms with the room available in the plane compartment. The car should either be an open car or must have a top part which is, at least partly, removable. The drawings merely indicate roughly the outlines of a car as usable in the airplane shown.

As can be seen from Figs. 4, 6 and 7 the car, the engine of which is preferably at the rear, has an opening 55 at its lower front end which is large enough to give access to the foot pedals 45. A cover 56 is provided which is horizontally slidable on guide rails 57. Projections 58 may be provided by means of which the cover can be readily moved by the foot of the driver into its open and closed position. The wind shield 59 is pivoted to the car with its lower edge and may be flapped down into horizontal position and secured in any position by means of winged screws 60. The control means for the car are in a conventional way arranged for operation from the left front seat. Only the steering wheel 61 with a part of the steering column 62 are shown in the drawings. Hooks 63 or the like are provided at one or both sides of the car in easy reach from the driver for engagement with the rings 53 of the tie means. Two front seats are designated by 65 and 66.

The operation of the means of transportation as shown and described in this specification is as follows:

Outside of the airplane the motor car is used as any ordinary motor car as all controls are of the standard type. When the driver wants to board the airplane with his car he drives close to the plane. He may put his car a short distance behind the plane body, between the two booms and may leave the car in order to open the compartment door 22, or he may drive with his car close to the plane and open the door without leaving his car at all. The door can be opened by using the detachable crank 42 and operating the crank wheel 40. With this operation the chain and cable member 39 is moved and thereby the shafts 31 and 28 rotated. Through these rotations the door 22 is being opened and at the same time the ramp 23 lowered into the position shown in Figs. 3, 4 and 5. If it is more convenient, the door can as well be opened by using the door handle 22a and opening the door like any ordinary door. In this case, thru the movement of the door the ramp is actuated as well and the chain and cable mechanism runs without load.

As soon as the door is open and the ramp lowered, the man can drive the car inside the plane compartment. Before doing so, or when he is partly inside the plane, he will fold down the windshield 59 and push the cover 56 to the left with his foot by means of one of the projections 58. When the car is being driven into the plane, the front wheels will be guided by the guide rails 50 and the car will come to a final stop in exactly the right position by hitting the stop blocks 64. In this position of the car the foot pedals 45 and the control wheel 44 of the airplane controls are exactly in the right position for operation by the driver of the car who moves from the left front seat 66 to the right front seat 65 to act as the pilot. Before doing this, the driver will secure the car in its position by taking the rings 53 off the hooks 54 and attaching them to the hooks 63 provided at the outside of the car. Now the man will operate the crank 41, thereby raising the ramp 23 into the rear end of the compartment 20 and closing door 22. Special lock means, not shown in the drawings, may be provided to lock the door in its closed position.

After these manipulations have been performed, the motor car and the airplane form a unit, the car replacing the usual seat arrangement and other conveniences in the plane compartment. It is easily understandable that in this manner the airplane can be operated in the usual way from within the motor car without the driver's leaving the car at any time.

When the airplane has landed, similar operations will be performed by the driver or pilot in reverse order. The door is opened and the ramp lowered by operating the crank 41, the ties are detached from the car and the car is driven out of the compartment. Now the front opening 55 can be closed again, the windshield can be raised and also the top part of the car, if there is any, can be put into place, the airplane can be closed and the driver is ready to start his land travel.

It is obvious that the present invention offers an amazingly simple and convenient means of a combination of air and land travel whereby for both kinds of travelling vehicles are used which do not differ in their appearance from what the public is accustomed to see. No difficult attachment and detachment of bulky and heavy parts is necessary and a single man is able to perform all manipulations quite alone. Only by such means is it possible to make use of all the advantages of air travel as well as land travel.

Of course many different combinations and alterations are possible within the scope of this invention, the embodiment shown being merely an example of a possible utilization of the invention. The airplane may be of any standard type with any known type of propulsion means. The plane may be used without the car if necessary seat accommodations are provided for, which may be removed to make room for the car. The car itself may of course be of any standard construction as long as the features necessitated by the invention are provided for.

What we claim is:

1. Means for transportation comprising in combination: an aircraft having a fuselage, a compartment in said fuselage, a motor car equipped with two front seats in said compartment, said motor car being secured to said compartment in a predetermined position and having control means for its operation which are in conventional way operable from one of said front seats, further control means arranged in said compartment for the operation of said aircraft, said further control means being operable from the other one of said front seats and comprising foot pedals, an opening at the front part of said motor car close to the last mentioned front seat at the level of said foot pedals, means for opening and closing said opening, said opening being dimensioned for the passage of said foot pedals into said motor car when said motor car is placed into its predetermined position so that said foot pedals can be readily operated by the pilot seated on the last mentioned of said front seats.

2. An aircraft having a fuselage, a compartment inside said fuselage, an opening at the aft end of said compartment, a door to open and close said opening, a ramp operatively connected with said door to give access for a vehicle to enter said compartment, means inside and at the front end of said compartment for simultaneously operating said door and said ramp, control means in the front end of said compartment for the operation of the aircraft, said control means comprising foot pedals supported on the free ends of bent levers, said foot pedals being adapted to protrude into the operator's compartment of a vehicle driven into said aircraft.

3. Means for transportation comprising in combination: an airplane having a fuselage, a compartment in said fuselage, a motor car in said compartment, an opening at the aft end of said compartment, a ramp near said opening, a door to close said opening, means for lowering said ramp and opening said door, said means being readily operable from within said motor car when said motor car is inside said compartment as well as when it is outside the airplane, guide rails on the floor of said compartment to guide the front wheels of said motor car into a predetermined position, at least one stop means at the front end of said compartment to stop said motor car in said predetermined position, means for detachably fastening said motor car to said compartment in its predetermined position, two front seats in said motor car, control means for said motor car operable from one of said front seats, further control means for said airplane operable from the other one of said front seats, said further control means comprising foot pedals and a control wheel, an opening at the lower front end of said motor car to give access for said foot pedals into said motor car, and a windshield on said motor car, said windshield being adapted to clear the path for said control wheel while the motor car is moved into and out of said compartment.

4. Means for transportation comprising, in combination, an aircraft having a fuselage, a compartment in said fuselage, a motor car equipped with a seat in said compartment, means for securing said motor car in said compartment in a predetermined position, control means associated with the motor car for its operation from said seat in a conventional manner, further control means arranged in said compartment for the operation of said aircraft, said further control means likewise being operable from said seat and including foot pedals, the front portion of said motor car having an opening therein, said opening being dimensioned for the passage of said foot pedals into said motor car when said motor car is placed into its predetermined position so that said foot pedals can be readily operated by the pilot seated on such seat.

5. An aircraft having a fuselage, a compartment inside said fuselage, an opening at the aft end of said compartment, closure means comprising a door to close said opening, a ramp located adjacent said door to provide means for a vehicle to enter said compartment, means within said compartment for closing said door and raising said ramp, control means in the front end of said compartment for the operation of the aircraft, said control means including foot pedals, said foot pedals being adapted to protrude into the operator's compartment of a vehicle driven into said aircraft.

6. Means for transportation comprising, in combination, an airplane having a fuselage, a compartment in said fuselage, a motor car in said compartment, an opening at the aft end of said compartment, a ramp near said opening, a door to close said opening, means for lowering said ramp and opening said door, said means being readily operable from within said motor car when said motor car is inside the compartment as well as when it is outside the airplane, guide means on the floor of said compartment to guide the front wheels of said motor car into a predetermined position, a stop element at the front end of said compartment to restrain forward movement of said motor car when it has reached said predetermined position, a front seat in said motor car, control means for said motor car operable from said seat, control means for said airplane operable from said seat, said latter control means comprising foot pedals and a control wheel, the lower front end of said motor car having an opening to give access for said foot pedals into said motor car.

ROBERT C. READ.
ERNEST W. SCHLIEBEN.